United States Patent [19]

Zielinski

[11] 4,355,600
[45] Oct. 26, 1982

[54] PROTECTIVE BODY SUIT FOR ANIMALS

[76] Inventor: Gloria J. Zielinski, 716 Scenic Dr., West Trenton, N.J. 08628

[21] Appl. No.: 218,436

[22] Filed: Dec. 19, 1980

[51] Int. Cl.³ .................. B68C 5/00; A61D 9/00; A01K 29/00; A61F 5/40
[52] U.S. Cl. .................. 119/143; 128/159; 54/79
[58] Field of Search .................. 119/143; 54/79, 80; 128/155, 159, 171

[56] References Cited

U.S. PATENT DOCUMENTS

| 1,592,496 | 7/1926 | Madden | 128/155 |
| 2,273,706 | 2/1942 | Hafner | 54/79 |
| 2,400,781 | 5/1946 | Priour | 54/79 |
| 3,211,132 | 10/1965 | Hersh | 119/143 |

FOREIGN PATENT DOCUMENTS 689647 10/1979 U.S.S.R. .................. 54/79

Primary Examiner—Gene Mancene
Assistant Examiner—Robert P. Swiatek
Attorney, Agent, or Firm—Dowrey & Cross

[57] ABSTRACT

A protective body covering for a four-legged mammal which will hold a bandage against its body includes a tube of elastic fabric having at least four holes through which the animal's legs may be inserted, the tube being substantially closed at one end and the head of the mammal being inserted through the open end, and adhesive strips, ties, or the like for attaching a bandage to the elastic tube, rather than to the animal.

10 Claims, 8 Drawing Figures

PROTECTIVE BODY SUIT FOR ANIMALS

BACKGROUND OF THE INVENTION (1) Field of the Invention

This invention is in the field of protective shields for animals, in the form of a protective article of clothing.

(2) Description of the Prior Art

Caring for dogs and other pets which have undergone surgery or have other medical problems has been difficult in the past. Animals tend to paw at bandages and wounds, often resulting in the tearing out of stitches. If no dressing is placed on a wound, discharge from the wound can get on rugs, furniture, etc., and also can create a terrible odor. The wound can also be unsightly and distressing to view. However, the application of a gauze dressing to a wound, and the changing of the dressing, has heretofore been difficult because of difficulty of taping a bandage onto an animal which often will not keep still. Also, tape has a tendency to slide along an animal's fur-covered body.

In the past, some have attempted to alleviate the problem of animals pawing at bandages and wounds by providing body coverings for animals, like that shown in Adair U.S. Pat. No. 3,895,628. However, such a body covering does not eliminate the problem of fastening the bandage against an animal's body.

In Huey U.S. Pat. No. 3,141,443, an attempt was made to alleviate the difficulty of fastening a bandage against an animal's body by holding the bandage within a pocket in the body covering. This does not totally solve the problem, however, since the bandage can only be held in one fixed position relative to the animal's body. Thus, one covering cannot accommodate wounds or other conditions requiring bandaging on a variety of locations on an animal's torso.

Such body coverings also may create new problems relating to the comfort of the animal, since waterproof material has been used for such coverings. Also, manufacturing expense becomes a problem when the protective covering must be made in a variety of sizes in order to accommodate animals of different sizes.

SUMMARY OF THE INVENTION

It is an object of the present invention to prevent an animal from pawing or chewing at the wound or bandage.

It is a further object of the invention to make easy the application of a gauze dressing or bandage to an animal's body, and the changing of the dressing, by removing the need to tape the dressing to the animal.

It is a further object of the invention to provide a single body covering which can accommodate wounds or other conditions requiring bandaging anywhere on the animal's torso.

It is a further object of the invention to provide a body covering which will remove the unsightly appearance of a wound.

It is a further object of the invention to provide a body covering which will allow the maximum comfort for the animal wearing it.

It is a further object of the invention to provide a body covering which can accommodate animals of different sizes.

It is a further object of the invention to provide a body covering for animals which is inexpensive to manufacture.

The protective body covering, or body suit for a four-legged mammal to hold a bandage against its body comprises a tube of elastic fabric having at least four holes through which the animal's legs may be inserted, the tube being substantially closed at one end, and the head of the mammal being inserted through the open end, and means for attaching a pad or bandage to the elastic tube at substantially any position on the tube.

DESCRIPTION OF THE PREFERRED EMBODIMENTS

Figure 1:
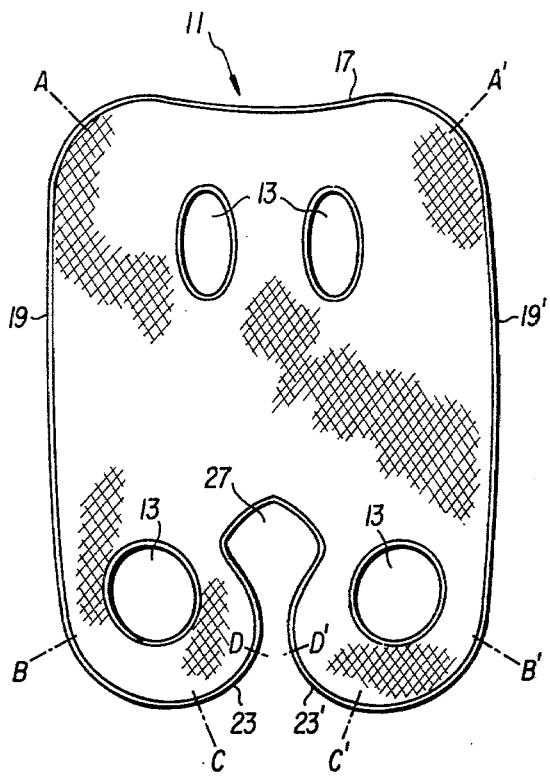
FIG. 1 is a schematic view of a pattern for the protective body suit for a male animal.

Referring to FIGS. 1 to 4, the protective body covering, or body suit, 11 is constructed from a sheet of elastic fabric. FIG. 1 shows a pattern in which the fabric may be cut before assembly. Four leg openings 13 are cut into the sheet. An opening 15 for the head is formed by the edge 17 between points A and A'. Edge 19 (from point A to point B) will be connected to edge 19' (from point A' to point B'), preferably by releasable means such as a plastic zipper 21 and snap fastener 22. Other possible means for releasably joining these edges are hook and loop fasteners such as those sold under the trademark VELCRO, a row of ties or snap fasteners. The use of the zipper 21 is preferable because it is a faster means for fastening the body suit once it is on the animal. To make the suit adjustable for a wide range of animal sizes, two or more zipper halves can be sewn parallel to each other on side 19 or 19'.

Figure 2:
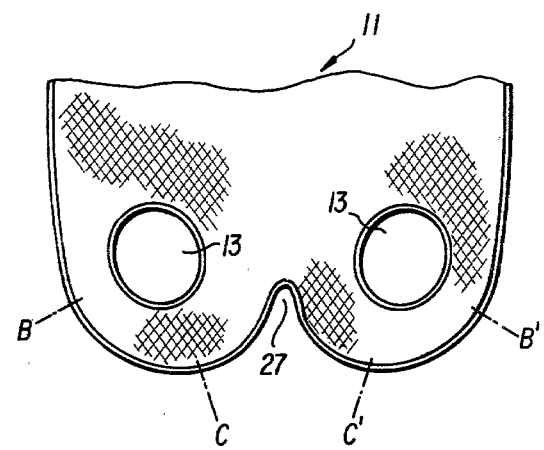
FIG. 2 is a schematic view of the rear portion of the pattern shown in FIG. 1 modified for a female animal.

Curvilinear edges 23 (from point C to point D) and 23' (from point C' to point D') are permanently joined by a row of stitching. This will form tail and rectum opening 25 (between points B-B' and C-C') and opening 27 for the urinary organ and testicles of the male animal. FIG. 2 shows the modification of opening 27 for a female animal.

The body suit will be made of an elastic fabric, with an open mesh fabric such as the fishnet stocking material available from the Danskin Co. being preferable. Because of the great stretchability of this fabric, one body suit can accommodate a great range of size of animals. Also, the stretchability allows for great ease in placing the suit on the animal.

The edges of leg openings 13, head opening 15, tail opening 25 and opening 27 may be finished with seam binding. Preferably, an elastic seam binding will be used. Or a strip of elastic can be woven through the mesh around the openings and its ends secured together.

The body suit is used in conjunction with a pad 29 of gauze, cotton or other material suitable for use as a bandage. The pad 29 will be adapted to be attached to the body suit so that it need not be attached to the animal.

Figure 5:
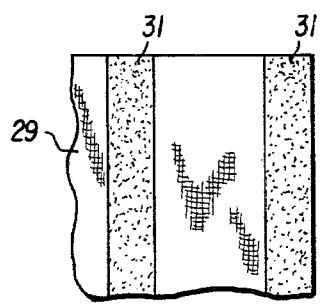
FIGS. 5–8 are partial plan views of four embodiments of pads to be used with the body suit of the invention.

FIGS. 5, 6, 7, and 8 show partial views of different embodiments of the pad 29 to be used with the body suit. In FIG. 5, adhesive strips 31 are located on the side of the pad 29 which will contact the body suit. These adhesive strips 31 are like those commonly used on sanitary napkins and like articles. At least one strip must be used on each pad.

Figure 6:
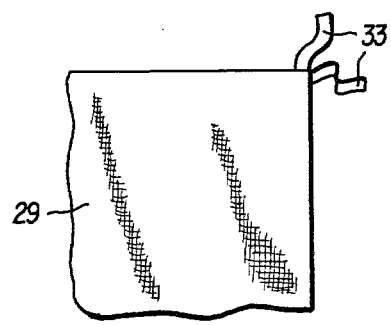

In FIG. 6, two short ties 33 are located along an edge of the pad. Each pair of short ties 33 can be slipped through the mesh of the body suit 11 and then tied together to hold the pad in place. A plurality of pairs of short ties 33 are located around the edge of the pad, and preferably will be attached to each corner of a rectangular pad. This is the embodiment shown in FIG. 3.

Figure 7:
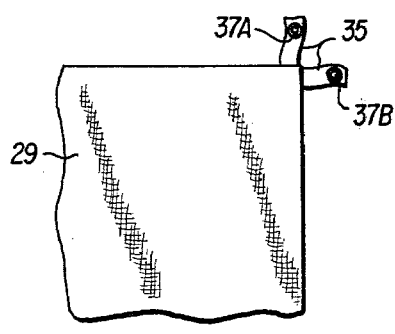

In FIG. 7, a pair of tabs 35 is located at the corner of the pad 29. Each of the pair of tabs 35 is supplied with snap fasteners 37A and 37B.

Figure 8:
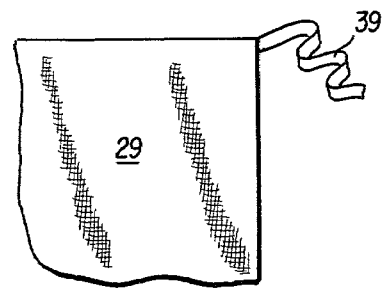
Figure 3:
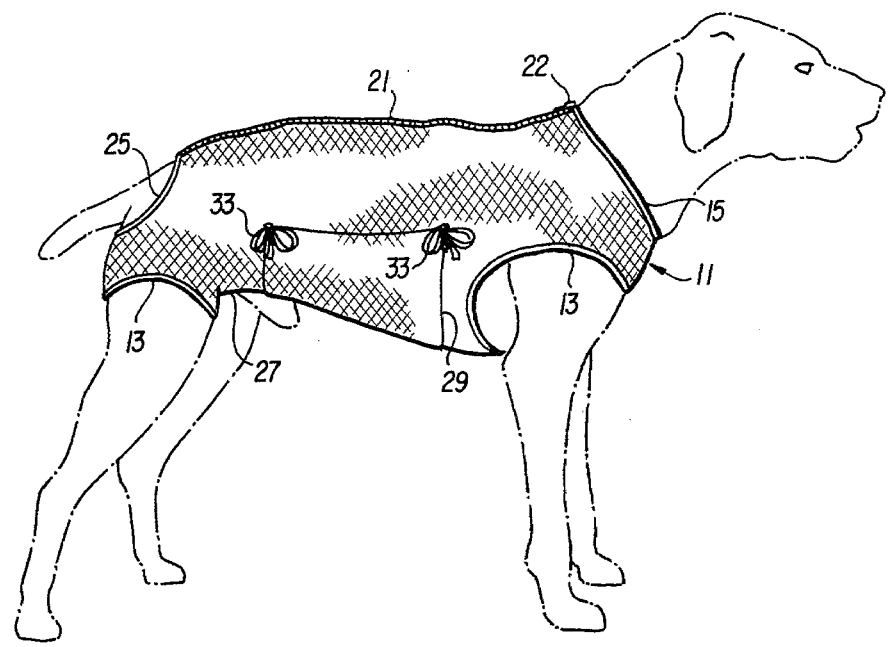
FIG. 3 is a side plan view of the body suit being worn by a dog.
Figure 4:
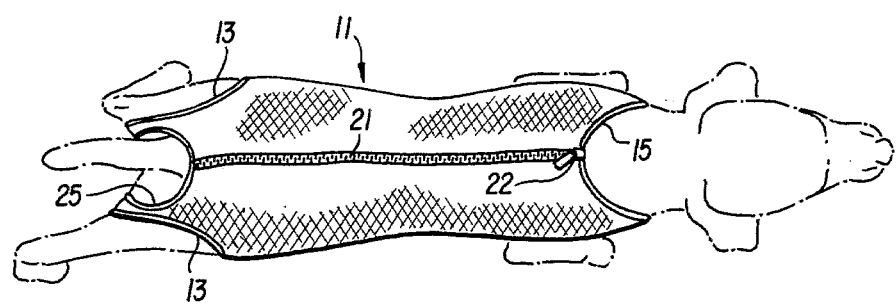
FIG. 4 is a top plan view of the body suit being worn by a dog.

In FIG. 8, one long tie 39 is attached to a corner of the pad 29. A single long tie 39 is attached to each corner of the pad 29, and ties 39 from opposing corners are wrapped around the animal and tied together.

Another alternative is to secure the pad with a wide elastic belt fastened at the back with hook and loop fasteners like those sold under the trademark VELCRO. This belt would be placed over the body suit after the pad is put in place.

The attaching means shown in FIGS. 6, 7 and 8 must be used with a body suit made of an open mesh fabric.

The use of these means of fastening the pads to the body suit avoids the problems associated with taping a pad to an animal, such as the difficulty of applying and removing the pad, and the shifting of the taped pad against the body of a long-haired animal.

Other means for fastening the pad to the body suit, though not specifically mentioned, are within the scope and spirit of the invention.

What is claimed is:
1. A protective body covering for holding a pad against the body of a four-legged mammal comprising:
a. a tube of elastic open mesh fabric having at least four holes therein through which the mammal's legs may be inserted and being substantially closed at one end, the mammal's head being inserted through the open end of the tube; and
b. means for attaching the pad to the elastic tube at substantially any position comprising a plurality of pairs of ties located around the edges of the pad, whereby the ties can be inserted into the mesh of the fabric and tied around the mesh, and whereby the pad will be held in a stationary position against the mammal's body.

2. A protective body covering for holding a pad against the body of a four-legged mammal comprising:
a. a tube of elastic open mesh fabric having at least four holes therein through which the mammal's legs may be inserted and being substantially closed at one end, the mammal's head being inserted through the open end of the tube; and
b. means for attaching the pad to the elastic tube at substantially any position comprising a plurality of pairs of tabs having snap fasteners attached thereto around the edges of the pad, whereby a pair of tabs can be inserted into the mesh of the fabric and fastened around the mesh with the snap fasteners, and whereby the pad will be held in a stationary position against the mammal's body.

3. A protective body covering for holding a pad against the body of a four-legged mammal comprising:
a. a tube of elastic open mesh fabric which will stretch to conform to the mammal's body having at least four holes therein through which the mammal's legs may be inserted and being substantially closed at one end, the mammal's head being inserted through the open end of the tube; and
b. means for attaching the pad to the elastic tube at substantially any position on the mammal's body comprising a plurality of pairs of ties attached to the edges of the pad, each pair having one tie attached to one edge of the pad and the other tie attached to the opposed edge of the pad, the ties being insertable through and around the mesh of the fabric and tied around the mammal's body.

4. A protective body covering for a four-legged mammal comprising:
a. a tube of elastic open mesh fabric having at least four holes therein through which the mammal's legs may be inserted and being substantially closed at one end, the mammal's head being inserted through the open end of the tube;
b. a pad;
c. means for attaching the pad to the elastic tube at substantially any position, comprising a plurality of pairs of ties located around the edges of the pad, whereby the ties can be inserted into the mesh of the fabric and tied around the mesh, and whereby the pad will be held in a stationary position against the mammal's body; and
d. a releasable fastening means along a longitudinal line on the tube from the open end to the closed end.

5. A protective body covering for a four-legged mammal comprising:
a. a tube of elastic open mesh fabric having at least four holes therein through which the mammal's legs may be inserted and being substantially closed at one end, the mammal's head being inserted through the open end of the tube;
b. a pad;
c. means for attaching the pad to the elastic tube at substantially any position comprising a plurality of pairs of tabs having snap fasteners attached thereto around the edges of the pad, whereby a pair of tabs can be inserted into the mesh of the fabric and fastened around the mesh with the snap fasteners and whereby the pad will be held in a stationary position against the mammal's body; and
d. a releasable-fastening means along a longitudinal line on the tube from the open end to the closed end.

6. A protective body covering for a four-legged mammal comprising:
a. a tube of elastic open mesh fabric having at least four holes therein through which the mammal's legs may be inserted and being substantially closed at one end, the mammal's head being inserted through the open end of the tube;
b. a pad;
c. means for attaching the pad to the elastic tube at substantially any position comprising a plurality of pairs of ties attached to the edges of the pad, each pair having one tie attached to one end of the pad and the other tie attached to the opposed end of the pad, the ties being insertable through and around the mesh of the fabric and tied around the mammal's body.

7. A protective body covering for an animal comprising:
a tube of open mesh elastic fabric;
a pad,
means engaged with said open mesh of said fabric and extending therethrough for attaching said pad to said covering, whereby said pad is capable of being attached to said fabric at substantially any position along said body of said animal.

8. A protective body covering according to claim 7 wherein the attaching means comprises a plurality of pairs of ties on said pad, the ties being engaged with and extending through the open mesh and secured thereto.

9. A protective body covering according to claim 7 wherein the attaching means comprises a plurality of pairs of tabs, having snap fasteners attached thereto, on said pad, the tabs being engaged with and extending through the open mesh and secured thereto.

10. A protective body covering according to claim 7 wherein the attaching means comprises a plurality of ties on said pad, the ties being engaged through and around the mesh of the fabric and tied around the animal's body.

* * * * *